United States Patent [19]

Heifetz

[11] Patent Number: 5,331,801
[45] Date of Patent: Jul. 26, 1994

[54] RECYCLED YARNS FROM TEXTILE WASTE AND THE MANUFACTURING PROCESS THEREFOR

[75] Inventor: David S. Heifetz, Niagara-on-the-Lake, Canada

[73] Assignee: Eco Fibre Canada Inc., Niagara-on-the-Lake, Canada

[21] Appl. No.: 825,152

[22] Filed: Jan. 24, 1992

[51] Int. Cl.⁵ ................... D01H 4/00; D01G 13/00
[52] U.S. Cl. ........................... 57/400; 57/252; 19/98; 19/107; 19/145.5
[58] Field of Search .................. 19/48 R, 39, 66 CC, 19/107, 115 B, 65 A, 144, 145, 145.5, 297, 303, 98; 57/252, 400, 243, 282, 283, 300, 306; 241/30, 301

[56] References Cited

U.S. PATENT DOCUMENTS

| | | | |
|---|---|---|---|
| 1,889,615 | 11/1932 | Schorsch | 19/65 A |
| 2,155,519 | 4/1939 | Whitehead | 57/283 |
| 4,075,942 | 2/1978 | Johnson, Jr. | 19/308 |
| 4,300,267 | 11/1981 | Winch et al. | 19/200 |
| 4,301,573 | 11/1981 | Gunter et al. | 19/200 |
| 4,914,787 | 4/1990 | Leifeld et al. | 19/145 |

FOREIGN PATENT DOCUMENTS

| | | | |
|---|---|---|---|
| 2300828 | 10/1976 | France | 19/107 |
| 7900885 | 11/1979 | PCT Int'l Appl. | 19/107 |
| 9012908 | 11/1990 | PCT Int'l Appl. | 19/107 |
| 1490171 | 6/1989 | U.S.S.R. | 19/65 A |
| 1590489 | 9/1990 | U.S.S.R. | 19/65 A |
| 1148518 | 4/1969 | United Kingdom | 19/107 |
| 2010936 | 7/1979 | United Kingdom | 19/107 |
| 2051900 | 1/1981 | United Kingdom | 19/107 |

OTHER PUBLICATIONS

Lord, Peter, "The Economics, Science and Technology of Yarn Production" 1981, pp. 78-113, 148-151, 174-181, 474-477.
Goswami, Martindale, Scardino, "Textile Yarns" 1977, pp. 312-315.

Primary Examiner—Clifford D. Crowder
Assistant Examiner—Michael A. Neas
Attorney, Agent, or Firm—R. Craig Armstrong

[57] ABSTRACT

The subject invention provides a new method for manufacturing yarns using recycled cotton waste and a new type of recycled cotton yarn. Various types of cotton waste materials such as manufacturing by-products and post-consumer material are used in conjunction with virgin yarns to produce recycled yarns of sufficient quality to be used for garment manufacture.

14 Claims, 1 Drawing Sheet

RECYCLED YARNS FROM TEXTILE WASTE AND THE MANUFACTURING PROCESS THEREFOR

FIELD OF THE INVENTION

The present invention relates to the textile industry and the manufacture of yarns, and in particular relates to the utilization of inexpensive cotton waste materials as the source material in a process for making recycled cotton yarn.

BACKGROUND OF THE INVENTION

In the cotton textile industry, using the current processes of producing finished apparel and related goods from raw virgin cotton, 20–49% of the original fibre in the raw material is typically separated as waste in the various processes. Once produced the finished goods have a limited life; when they have ended their useful life they are possibly used as rags for a brief period and then typically discarded to end-up in a landfill or waste incineration facility.

This manufacturing and post consumer waste generated in this way is extensive. According to The By-products Association of America, in 1990, approximately 7.7 billion pounds of new and used fabric and clothing and related textile products were discarded.

Cotton agriculture also has a significant impact on the environment and is the highest or second highest agricultural user of pesticides, herbicides and fungicides.

Our society is becoming increasingly aware of the severity of our environmental problems and in particular the scarcity of appropriate landfill sites, and the deleterious impact of waste incineration, industrial discharges, and the use of pesticides and other chemicals in agriculture. As a result of this increasing awareness it is becoming increasingly important to reduce the amount of waste we generate, recycle more of the waste that is generated, and reduce or eliminate as much toxic chemical use as possible. Governments often regulate these matters making such efforts not only environmentally responsible but often necessary to comply with the law.

The chart below sets out some of various types of manufacturing and post consumer textile wastes along with some current or potential uses of these materials.

| MANUFACTURING WASTES | | |
|---|---|---|
| Waste type | % of crop | Current or Potential uses |
| gin motes | 5% | Coarse count yarns |
| carding waste | | (such as for mop heads, |
| drafting waste | | some upholstery yarns, |
| | 5% | industrial belting, |
| | | rope and twine). |
| comber noils | 5-7% | Paper making. |
| drawing wastes | | Health and beauty aids. |
| fly waste | | Upholstery stuffing and bedding. |
| yarn & thread ends | 2-3% | Stuffing |
| fabric & fabric trimmings* | 8-34% | Stuffing |
| Total | 20–49% of cotton harvested | |

| POST CONSUMER TEXTILE WASTE | |
|---|---|
| Waste Type | Uses |
| synthetic producer's waste | Stuffing, felts, industrial belting, rope, twine. |
| used clothing | Rags. |

Only a portion (in some cases very small) of each waste type is being recycled or reused. Much of the cotton waste goes directly to landfills and a large proportion of the gin motes are being ploughed under in farmers fields to eliminate the increasing tipping fees associated with commercial waste disposal.

While there are potential uses for these wastes, unfortunately not all of these wastes are being reused or recycled. Even when these materials are recycled or reused, most of the uses for these wastes are for relatively low value goods which often have a very short useful life. If a higher value and more durable use is found for these wastes, then much more of these wastes will be used—which will reduce the waste stream into landfills and waste incineration facilities, and reduce the amount of pesticides, herbicides, fungicides, and other chemicals used in growing and processing cotton by decreasing the amount of virgin cotton needed for the apparel and related industries.

This invention is the use of any and all of these wastes for the manufacture of yarns of high enough quality, and thus higher value, for use in the garment and related industries. Specifically, this invention involves the use of pre-consumer and post-consumer fabric/apparel waste in the manufacture of high quality yarns using a process that is economically feasible on a commercial scale.

While most of the types of waste materials that are recycled to make these high quality have already been reused or recycled to some extent in other products, most of the uses for these wastes are for very low value goods and only a portion of the wastes are being reused or recycled. While some of these wastes are also being recycled into new yarns, as shown in chart above, these yarns are typically coarse count yarns not suitable for use in the apparel industry, except possibly for use in heavy woven outerwear or sweaters. These conventional uses are definitely lower value uses than the products of this invention.

The process of the subject invention involves making finer count—being 8 count and above—cotton yarns either completely from 100% recycled cotton textile waste, or using a combination of virgin and recycled cotton, together with post-consumer shoddy to fabricate yarns of quality suitable for the apparel and related textile industries.

The principle of this invention is that through processing the waste fibres differently, and by twisting the yarn made from these fibres differently, finer count yarns can be made from 100% cotton textile waste and from blends of 100% cotton and synthetic wastes; and by processing used clothing differently to open the fabric up with less breakage and better parallel alignment of fibres, post-consumer shoddy can also be used when blended with other textile fibre wastes or virgin cotton to make yarns suitable to the apparel industry.

BRIEF DESCRIPTION OF THE DRAWINGS

Various embodiments of the described manufacturing process of the subject invention will now be described with reference to the accompanying drawings, in which.

DETAILED DESCRIPTION OF THE PREFERRED AND ALTERNATIVE EMBODIMENTS

Figure 1:
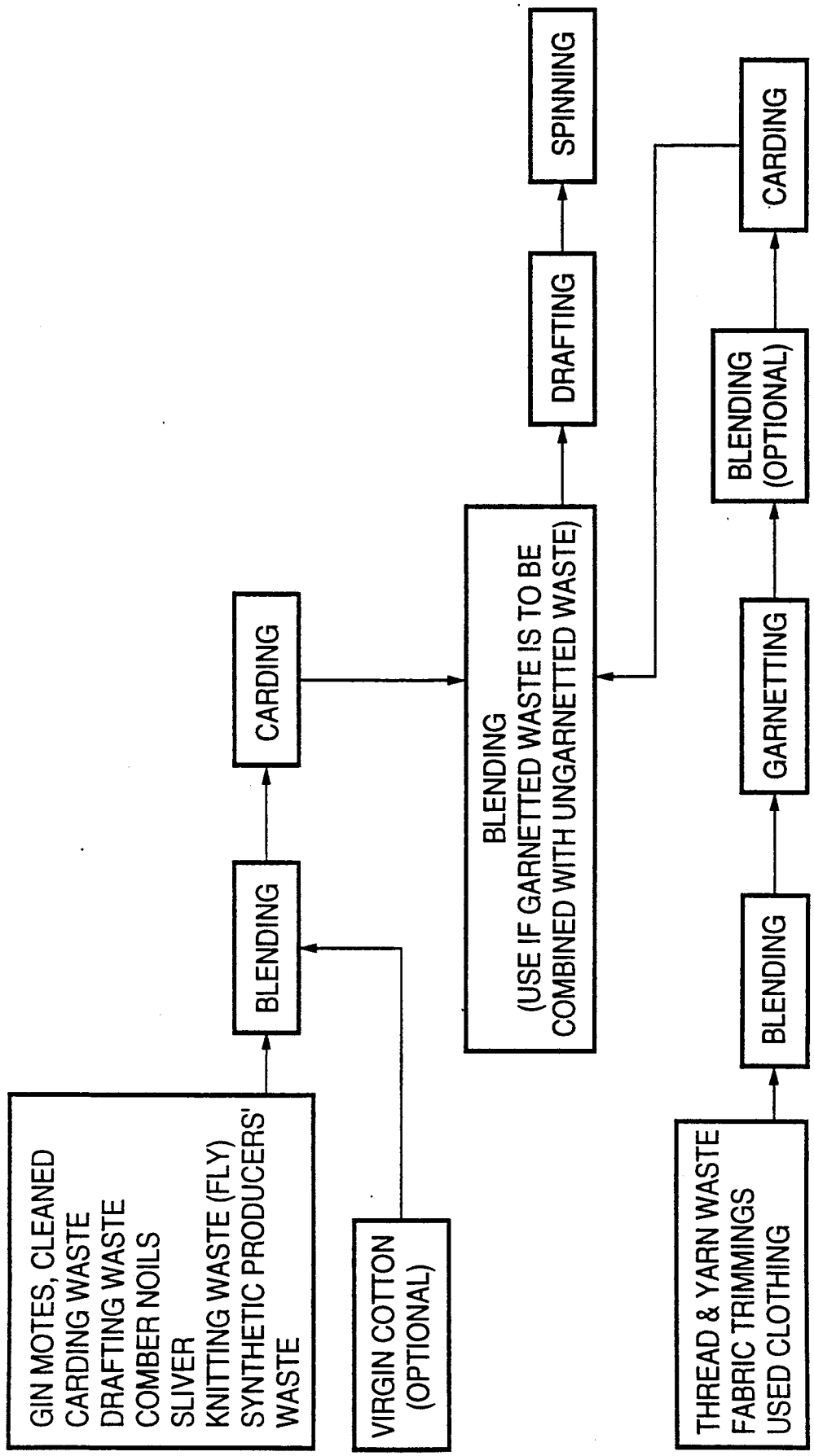
FIG. 1 is a block diagram depicting the stages of the process of the subject invention.

Referring to the diagram, the gin mote wastes must first be cleaned. This process is accomplished by passing the motes through one or more conventional cotton cleaning and/or opening machines. This process is a relatively standard operation. The gin motes are the only waste type used that require a pre-cleaning process.

Gin motes are the wastes created when mechanically harvested cotton is cleaned. The gin motes consist of long or spinnable cotton fibres, short unspinnable fibres, and unwanted debris, consisting of leaves, twigs, bolls, seeds, sand and dirt. The cotton gin opens the gin motes by pulling it apart and allowing the heavier debris like seeds, twigs, and sand to fall out with some of the lighter debris.

After the gin motes have been cleaned and opened, the motes, carding waste, drafting waste, comber noils, drawing wastes, and fly are then blended before carding begins. All of the types of waste mentioned here need not be used for a particular yarn. The exact combination of raw materials used for any particular batch will depend on the availability of raw materials at the time of processing.

In some cases the carding and all the processes through spinning will be done at another mill, in which case the cleaned or reclaimed gin motes and other wastes will probably be baled before being sent to the spinner for blending and/or carding and must be processed through opening equipment before being processed through conventional cotton carding machines.

The next step in the process if blending. Blending is usually used to meet the cost and property designs of a specific fabric and is also a relatively standard process. If bales were sent to another mill, tufts of the different fibres would be cut off different bales in the desired blending proportion, and sucked into a large mixing box which has air blown around to mix the different fibres and then the fibres would be sent into the carding equipment.

Blending can take place at different points along the entire process of making yarns from textile waste as shown in diagram. Exactly when the blending takes place depends on the source of fibres being blended and the capabilities of each mill involved.

Carding is used to separate (or open), align and deliver fibres in a sliver form, which is described as a continuous strand of loose fibres about as thick as man's thumb with no twist. Carding is also used to further remove any impurities still present in the material.

The carding equipment consists primarily of cylinders with teeth. When processing gin motes, the carding equipment should also have crush rolls to break down remaining debris (leaves, bolls) and suction cleaning. This type of equipment is more appropriate because of the high proportion of debris in gin mote waste.

Next, in the drafting process, the fibres are brought into parallel alignment in preparation for spinning. The sliver is passed through a series of one or more pairs of rollers with each successive pair of rollers rotating faster than the previous pair. In this manner the sliver is drawn into a thinner strand of fibres and the alignment of fibres becomes more parallel. At this time twist is also added to the strand of fibres to preserve the strength of the sliver and prevent breakage.

At this point any other fibres going into the yarn such as those from thread & yarn waste, fabric trimmings, or used fabric/clothing are blended in the drafting process.

When processing virgin cotton fibres into yarn, the fibres would normally go through a combing process at this point to remove the shorter fibres as the shorter fibres make it difficult or even impossible to spin a strong enough yarn using standard spinning processes. In the present process the fibres are not subjected to a combing operation. Instead the yarn is twisted approximately 10–15% more than is standard with virgin cotton. This results in decreased waste, which would have to be disposed of, and to keep more of the original fibre in the finished products. Thus, operational costs are reduced by excluding the combing process and also reduce loss of source material.

Before going on to the spinning process the processing of the other types of wastes will be described up to the drafting step.

The fabric trimmings and used clothing may be blended before garnetting if there are different coloured pieces of the same type or similar types of fabric. However, if the fabric types are of significantly different physical properties (for example a very loose poly/cotton sweater knit and tight woven cotton) they should be garnetted separately and then blended afterwards, see diagram.

Before garnetting, all garments and/or fabric trimmings must be sorted by hand into similar types of fabric unless they were collected from one source and are already separated by fabric type. Also, the following need to be removed from clothing: 1) all buttons 2) all zippers 3) all heavy seams, such as taped seams or seams where fabric has been folded and double stitched 4) any other hard fasteners, etc. which the garnetting equipment either could not pull apart or which could not be used in making a yarn.

The goal to achieve in the garnetting process is to grind and pull the fabrics apart into a fibrous state as quickly as possible while preventing the breakage of too many of the individual fibres. If too many of the fibres break then the resulting yarn will be too weak. The faster the garnetting equipment runs, the lower the cost of the operation, and the more breakage of fibres.

When clothing and fabric trimmings are garnetted into fibres for use in making felts or maybe very coarse yarns, the equipment processes fabric at the rate of 2,000 to 5,000 pounds per hour or higher. In the present invention, the equipment processes 1,000 to 2,500 pounds of fabric and/or clothing per hour. The variation that permits use of garnetted fabric trimmings and clothing to make finer yarns than previously done on a commercial scale, and make them out of 100% waste, is that the equipment is run slower and spinning the yarn is done differently; this is explained later.

Next the garnetted waste must be carded. This waste is carded much more than virgin cotton or even previously described wastes. This should also be carded with the flat set about 50% closer than would be used for more typical types of waste such as gin motes.

As mentioned before any remaining blending of fibres is done in the drafting process(es). Typically at least two processes of drafting should be used, particularly if there is used clothing or shoddy in the fibre mix.

During the spinning process the equipment is slowed down and the yarn is given more twist; this gives the yarn greater strength and allows the use of fibres which are shorter than virgin cotton fibres. In spinning the yarns, it has been found that 10-20% more twists then normal when using virgin cotton will probably be needed for enough strength in the finished yarn. For example: the 10 count, 100% recycled cotton yarns produced by this process has 14 twists per inch instead of the 11-12 twists per inch of a cotton yarn made from virgin cotton fibres.

When speaking about the twists in a yarn there are two measures which are used, twists per inch and twist multiple. The equation which relates these two measures follows:

$\sqrt{10} \times$ twist multiple = twists per inch

In open end spinning, the standard twist multiple for 10 count 100% cotton yarn to be used in knitting is 3.50, our 100% recycled 10 count cotton yarn for knitting has a twist multiple of 3.90 to 4.10.

See the chart on the following page for twist multiples for open-end yarns created using this process:

| Size | Standard yarns (virgin) | Recycled yarns | Minimum Recycled content |
|---|---|---|---|
| TWIST MULTIPLES FOR RECYCLED YARNS vs STANDARD YARNS | | | |
| KNITTING YARNS | | | |
| 8 count | 3.20-3.30 | 3.60-3.90 | 100% |
| 10 count | 3.50 | 3.90-4.10 | 75% |
| 12 count | | | 50% |
| 14 count | | | 30% |
| 16 count | 4.00 | | 20% |
| 18 count | | | 10% |
| WARP YARNS FOR KNITTING | | | |
| 8 count | 3.50-3.60 | 4.75 | 100% |
| 10 count | 4.00-4.20 | 5.25 | 75% |
| 12 count | 4.60-4.80 | | 50% |
| 14 count | 4.85-5.10 | | 30% |
| 16 count | 4.85-5.25 | | 20% |
| 18 count | | | 10% |

While the preferred forms of the invention have been set forth and described in detail, it will be understood that this invention is not restricted to the particular details of construction and arrangements set forth and illustrated in the accompanying drawings, and it will be understood that changes may be made within the scope of what is hereinafter claimed.

What is claimed as the present invention is:

1. A method of processing a combination of virgin cotton fibres and fibrous, woven or spun textile waste as source material, to produce a high quality recycled twisted yarn therefrom, said method comprising the steps of:
   (a) providing said source material having a minimum content of recycled cotton waste of not less than 10% of the total source material;
   (b) processing said source material using standard blending, carding and drafting equipment;
   (c) further processing said material by open end spinning, said spinning operation imparting a minimum of an additional 10% more twists to the processed fibres than in standard spinning processes and producing a twisted yarn having a minimum 10 count size,
   where prior to blending the woven or spun textile waste said material is pre-processed by a method comprising the steps of:
   (a) manual sorting of the waste materials;
   (b) preparing said waste by removal of all buttons, zippers, heavy seams and hard fasteners;
   (c) garnetting said material at a significantly reduced processing rate of approximately 1,000 to 2,500 pounds of material per hour; and
   (d) carding said material extensively with the flats set at least 35% closer together than would be used for fibrous waste such as gin motes.

2. The method of claim 1 wherein said cotton waste materials comprise a combination of at least one of, carding waste, comber noils, drafting waste, fly waste, gin motes, fabric trimmings, thread and yarn waste or used fabric and clothing.

3. The method of claim 1, where prior to blending said gin motes are first cleaned and opened if necessary using standard equipment.

4. The method of claim 1, wherein said textile waste material comprises at least 50% of the total source material used to produce the yarn.

5. The method of claim 1, wherein said textile waste material comprises at least 95% of the total source material used to produce the yarn.

6. The method of claim 1, wherein the spinning process imparts a twist multiple in excess of 3.90.

7. A method of spinning normally unspinnable combination of at least 50% waste material consisting of at least one of uncombed, blended, drafted and carded fibrous, woven or spun textile waste, said method involving spinning said material by an open end spinning operation imparting a minimum of an additional 10% more twists than in standard spinning processes to form an even high quality recycled twisted yarn with a minimum 10 count size suitable for garment manufacture.

8. The method of claim 5 wherein said cotton waste materials comprise a combination of at least one of, carding waste, comber noils, drafting waste, fly waste, gin motes, fabric trimmings, thread and yarn waste or used fabric and clothing.

9. A method of processing a combination of virgin cotton fibres and fibrous, woven or spun textile waste as source material, to produce a high quality recycled twisted yarn therefrom, said method comprising the steps of:
   (a) providing said source material having a minimum content of recycled cotton waste of not less than 50% of the total source material;
   (b) processing said source material using standard blending, carding and drafting equipment;
   (c) further processing said material by open end spinning, said spinning operation imparting a minimum of an additional 10% more twists to the processed fibres than in standard spinning processes and producing a twisted yarn having a minimum 10 count size.

10. The method of claim 9 wherein said cotton waste materials comprise a combination of at least one of, carding waste, comber noils, drafting waste, fly waste, gin motes, fabric trimmings, thread and yarn waste or used fabric and clothing.

11. The method of claim 9, where prior to blending said gin motes are first cleaned and opened if necessary using standard equipment.

12. The method of claim 9, wherein said textile waste material comprises at least 95% of the total source material used to produce the yarn.

13. The method of claim 9, wherein the spinning process imparts a twist multiple in excess of 3.90.

14. A method of spinning normally unspinnable combination of at least 95% waste material consisting of at least one of uncombed, blended, drafted and carded fibrous, woven or spun textile waste, said method involving spinning said material by an open end spinning operation imparting a minimum of an additional 10% more twists than in standard spinning processes to form an even high quality recycled twisted yarn with a minimum 10 count size suitable for garment manufacture.

* * * * *